Dec. 3, 1940. C. J. VAN BUREN 2,223,395
AUTOMOBILE INSULATION
Filed Feb. 2, 1939
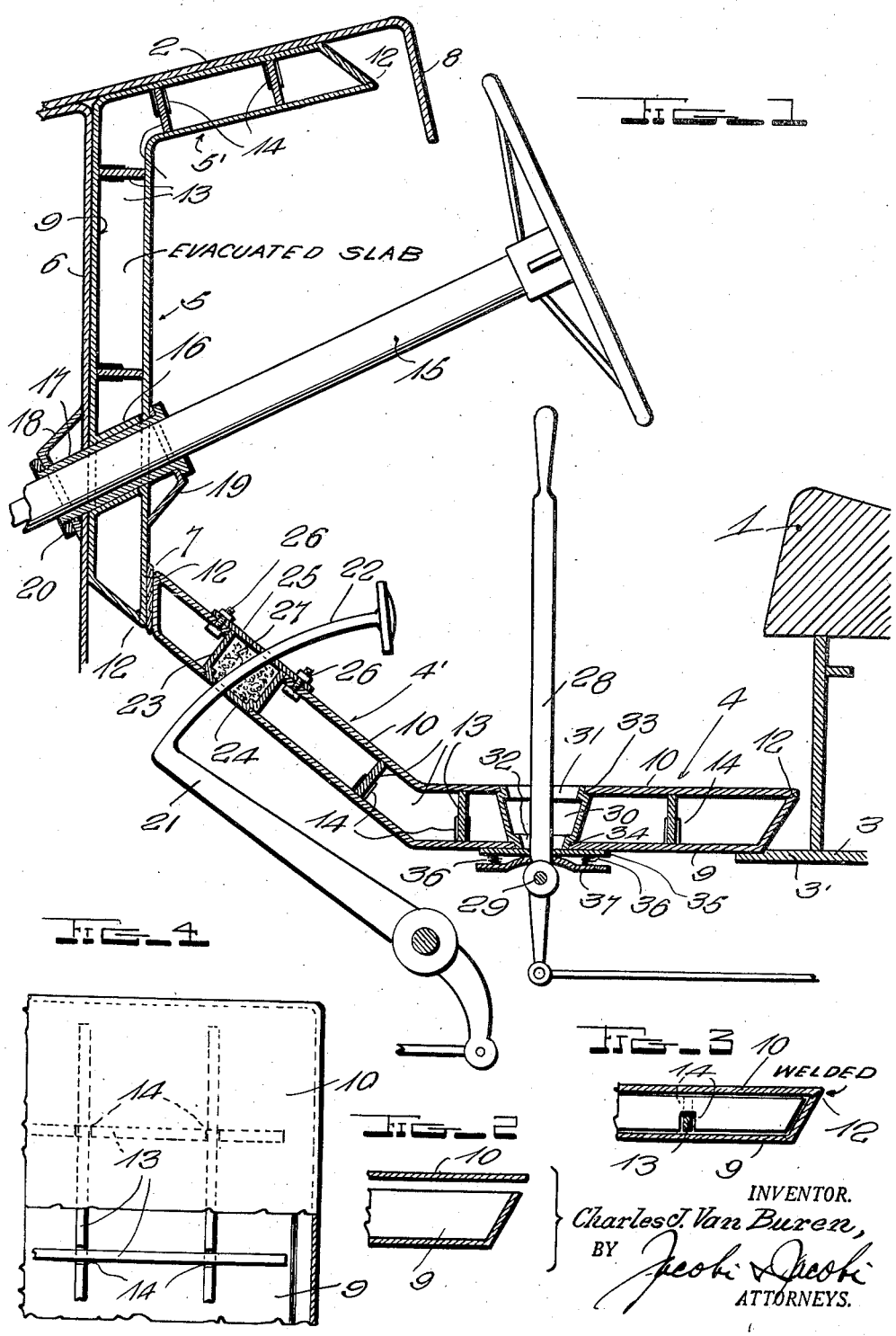
INVENTOR.
Charles J. Van Buren,
BY
ATTORNEYS.

Patented Dec. 3, 1940

2,223,395

UNITED STATES PATENT OFFICE 2,223,395

AUTOMOBILE INSULATION

Charles J. Van Buren, Fort Lauderdale, Fla.

Application February 2, 1939, Serial No. 254,292

4 Claims. (Cl. 296—28)

This invention relates to vehicles and more particularly to the construction of the body thereof, it being one object of the invention to provide an automobile with an improved construction which will insulate the floor boards and the dash board and very effectively prevent passage of heat and noise through the same without adding materially to the weight thereof. It will thus be seen that the driver of the automobile will be shielded from the heat of the engine and from heat reflected from a hot pavement along which the automobile is traveling as well as not being annoyed by engine noises or street noises while driving.

Another object of the invention is to so form the floor boards and the dash board that they will be of hollow formation from which air is withdrawn to provide a vacuum condition and thus prevent transmission of sound and heat through the floor boards and the dash board.

Another object of the invention is to so form the floor boards and the dash board that the steering column and the control pedals and levers may pass through the same in their usual positions and operated in the usual manner.

Another object of the invention is to so form the hollow slabs constituting the improved floor boards and dash board that while they will be hollow, they will at the same time be braced against collapse and not constitute a weakness in the construction of the car.

Another object of the invention is to so form the dash board that its upper portion will extend rearwardly under the engine cowl toward the instrument board and reinforce this portion of the cowl.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawing wherein:

Figure 1 is a longitudinal sectional view taken vertically through the forward portion of the body of an automobile and showing the improved construction of the floor boards and dash board.

Figure 2 is a fragmentary sectional view of an end portion of one of the hollow slabs, the upper wall thereof being in an elevated position.

Figure 3 is a view similar to Figure 2 showing the upper wall welded to the side walls of the slab and the bracing means for the slab in place.

Figure 4 is a fragmentary view showing one of the slabs partially in top plan and partially in section.

This invention relates to the construction of the floor boards and the dash board of an automobile which may be of any specific type and while only the forward portion of the automobile has been illustrated with the front floor boards and the dash board formed in accordance with the invention, it is to be understood that the rear floor boards may be of a similar construction.

In the accompanying drawing, the numeral 1 indicates the front seat and the numeral 2 indicates the rear portion of the engine cowl. The flooring 3 terminates a short distance in front of the seat 1 and provides a ledge 3' upon which rear end portions of the improved floor board 4 rests. This floor board may be of sufficient width to extend the full width of the automobile body or the improved flooring may be formed in sections if so desired. The forward portion 4' of the floor extends at an upward incline and at its front end bears against the lower end portion of the dash board 5 which is disposed against the rear face of a thin partition 6. A packing 7 of poured insulating material is provided between the dash board 5 and the confronting end of the upwardly inclined front end of the floor boards or flooring 4 to form a tight joint and prevent heat and sound from passing inwardly through a crevice between the dash board and the flooring. The upper portion 5' of the dash board extends rearwardly under the engine cowl 2 toward the instrument board 8 but terminates in spaced relation to the instrument board.

The dash board 5 and the flooring 4 are of hollow construction and each has a pan-like body 9 and a cover 10, the body 9 and its cover 10 being both formed of strong sheet metal and marginal portions of the cover being welded to the side and end walls of the body as shown at 12 in Figures 1 and 3. Before the cover 10 is applied and welded to the body 9, strips or spacing webs 13 are set in place within the body. These strips or webs extend longitudinally and transversely in the body and are recessed as shown at 14 so that the longitudinally and transversely extending strips have interfitting engagement with each other and cannot slip out of their proper positions in the body. These strips or bracing webs serve very effectively to brace the walls of the body and the closure plate and prevent collapsing when air is withdrawn to create a vacuum condition after the closure has been applied and welded into place. The air is extracted from the body by a suitable pump and the opening through which it is withdrawn sealed to maintain the vacuum condition within the slab formed by the body and its cover plate or wall.

The steering post or column 15 passes through the lower portion of the dash board 5 and in order to permit such passage, there has been provided a sleeve 16 extending from the front wall of the body 9 of the dash board to the cover 10 thereof about openings through which the steering column and a collar 17 pass. End portions of the collar pass through wedge-shaped binders 18 and 19 and when the nut 20 is tightened, the collar will be firmly held in place and prevented from slipping through the dash board out of its proper position.

The clutch pedal 21 is mounted in its usual position under the sloping forward portion 4' of the flooring 4 and the arcuate shank 22 of this pedal passes through a packing box 23 set into the body of the flooring. The lower end portion of this packing box is reduced as shown at 24 and fits into an opening in the lower wall of the body 9 of the flooring where it is welded into place and the upper portion of the box welded in an opening formed in the upper wall of the floor slab. A cover plate engages the upper end of the packing box with its marginal portions overlapping the upper wall of the flooring slab and in order to removably secure the cover 25, there has been provided tap bolts 26. The packing 27 in the packing box has close fitting engagement with the shank of the clutch lever and prevents heat or sound from passing through the openings through which the shank operates. It is to be understood that the foot operated brake pedal will be packed in a similar manner.

The lever 28 for the hand brake extends vertically through the flooring with its pivot 29 below the same and in order to accommodate this lever, there has been provided a well 30 which is tapered downwardly. This well extends vertically through the flooring and has its upper and lower end portions reduced to provide necks 31 and 32 which are snugly received in openings formed in the cover 10 and the bottom of the body or pan 9 of the flooring where they are welded firmly into place as shown at 33 and 34. A plate 35 for closing the lower end of the well fits about the lever and is pressed against the under face of the flooring by springs 36 carried by a plate or yoke 37 fitting about the lever under the closure plate 35. The springs press the closure plate firmly against the under face of the flooring slab and the plate serves very effectively to prevent air and dust and the like from passing upwardly through the well 30 as well as sound and heat from penetrating the interior of the automobile body. While it has been stated that the evacuated slabs exclude noise and heat from the interior of the automobile, it will be understood that they will also exclude cold, and during the winter, the automobile can be easily maintained at a comfortable temperature by an electrical heater.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In a motor vehicle construction, a body, an engine cowl extending forwardly from said body, flooring for said body, and a dash board rising from the front end of said flooring under said cowl, the flooring and the dash board being of hollow formation and evacuated to provide a vacuum insulation against passage of heat and noise, the flooring and the dash board each consisting of a pan-like body, a closure wall for the pan-like body secured continuously along its margins to walls of the pan-like body, and webs in the pan-like body constituting reinforcements therefor.

2. In a motor vehicle construction, a body, an engine cowl extending forwardly from said body, flooring for said body, and a dash board rising from the front end of said flooring under said cowl, the flooring and the dash board being of hollow formation and evacuated to provide a vacuum insulation against passage of heat and noise, the flooring and the dash board each consisting of a pan-like body, a closure wall for the pan-like body secured continuously along its margins to walls of the pan-like body, and reinforcing strips in the pan-like body extending longitudinally and transversely therein in crossed relation to each other with their intersecting portions recessed for interlocking engagement with each other.

3. In a motor vehicle, a body including members forming flooring and a dash board, one of said members being hollow and evacuated to provide a vacuum insulation, the said member consisting of a hollow pan-like body, a closure wall for the body secured continuously along marginal walls of the body to form an air tight seal and prevent leakage of air between the closure wall and the body, and means in said body to prevent collapsing of said member.

4. In a motor vehicle, a body including members forming flooring and a dash board, one of said members being hollow and evacuated to provide a vacuum insulation, the said member consisting of a pan-like body, a closure wall for the pan-like body secured continuously along marginal walls of the pan-like body to form an air tight seal therefor, and spacing strips in said body engaging the closure wall and serving to prevent collapsing of said member.

CHARLES J. VAN BUREN.